United States Patent [19]
Hansen

[11] 4,072,357
[45] Feb. 7, 1978

[54] CLAMP STYLE WHEEL BUSHING

[75] Inventor: Kenneth N. Hansen, Waukesha, Wis.

[73] Assignee: Allis-Chalmers Corporation, Milwaukee, Wis.

[21] Appl. No.: 643,311

[22] Filed: Dec. 22, 1975

[51] Int. Cl.² .............................................. B60B 37/00
[52] U.S. Cl. ...................................... 301/1; 301/111; 301/122
[58] Field of Search ......................................... 301/1-2, 301/111-112, 122, 65, 105 R, 126; 295/43; 403/356, 373, 344

[56] References Cited

U.S. PATENT DOCUMENTS

| | | | |
|---|---|---|---|
| 408,835 | 8/1889 | Grafton | 301/111 |
| 2,287,343 | 6/1942 | Duda | 403/373 X |
| 2,377,046 | 5/1945 | Siegerist | 403/356 |
| 2,507,093 | 5/1950 | Collings | 403/356 X |
| 2,591,253 | 4/1952 | Grismore | 301/1 |
| 2,637,598 | 5/1953 | Brown et al. | 301/1 |
| 3,084,000 | 4/1963 | Dubberke | 301/1 |
| 3,392,996 | 7/1968 | Dunn, Jr. et al. | 403/373 |
| 3,751,080 | 8/1973 | Bailey et al. | 403/344 |
| 3,889,553 | 6/1975 | Ballheimer | 403/344 X |
| 3,969,034 | 7/1976 | Gaul et al. | 301/1 X |

*Primary Examiner*—Robert B. Reeves
*Assistant Examiner*—Charles A. Marmor
*Attorney, Agent, or Firm*—Arthur L. Nelson

[57] ABSTRACT

A clamp style wheel bushing on a drive wheel of a tractor for clamping the drive axle to the drive wheel. The wheel hub and cap are cast with internal shaft bearing surfaces on the cap and hub to firmly clamp the drive axle and lock the drive wheel to the drive axle.

10 Claims, 4 Drawing Figures

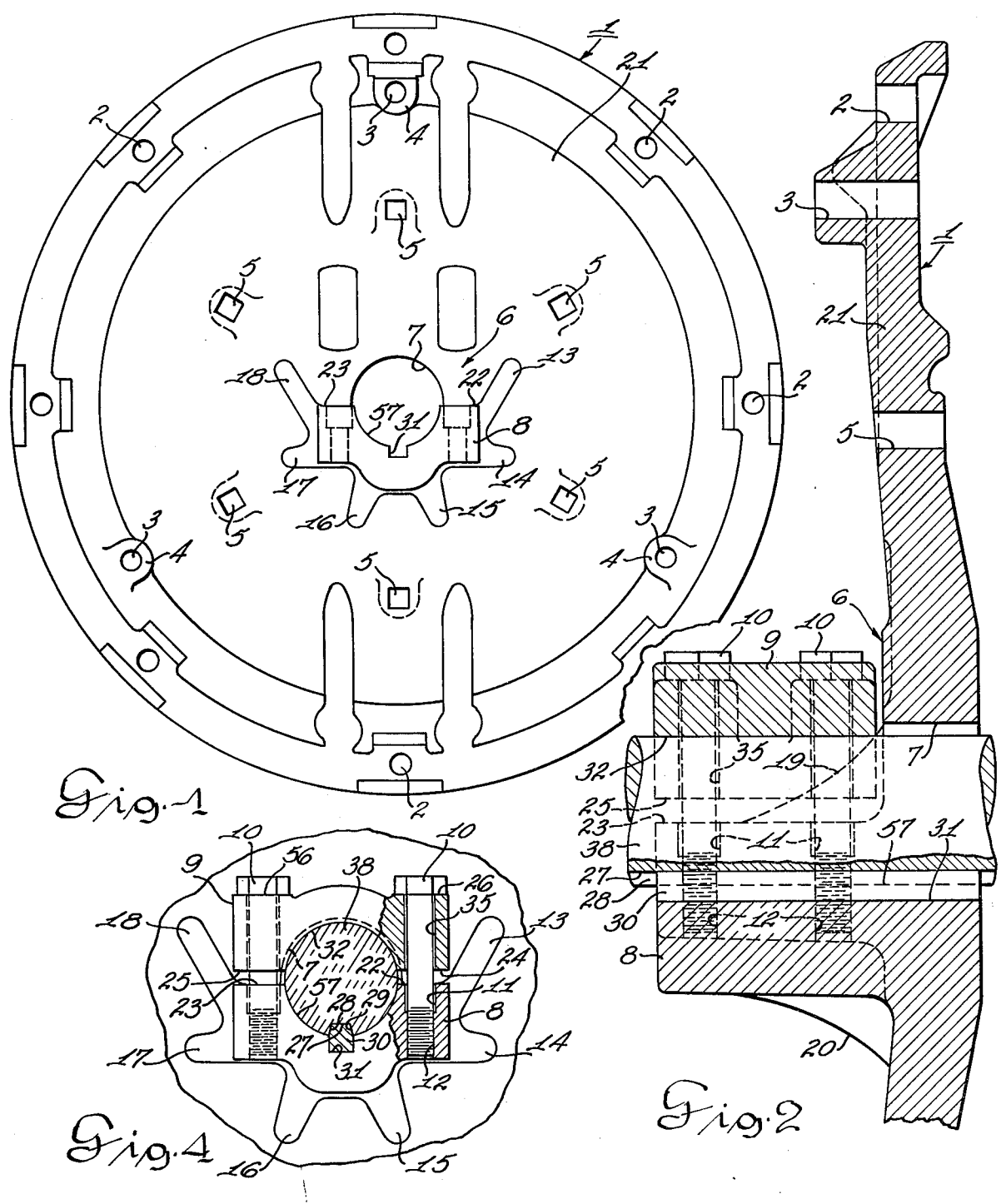

CLAMP STYLE WHEEL BUSHING

This invention relates to a drive wheel and axle and more particularly to a clamp style wheel hub section and cap hub section which are bolted together to lock the drive axle to the wheel by means of a plurality of cap screws. At least one key with keyways is provided between the axle and hub to assure a locking relation between the drive axle and drive wheel.

Drive wheels on tractors are generally coupled to the drive axle by means of a coupling which can be adjusted axially to vary the tread width of the wheels. By varying the tread width of the tractor wheels the tractor becomes more versatile. The varying of the tread width must be convenient for the operator, require the minimum number of tools, and must assure that at all times the drive axle and wheel are firmly locked together to absorb the torque requirements of the wheel under any load conditions.

Although many types of wheel couplings have been devised, for one reason or another they may not prove entirely satisfactory. The cost of manufacture is often a problem. Where multiple machining of surfaces, to provide close tolerances between surfaces is required, this soon increases the cost of wheel couplings. The reliability of the coupling is also an important factor. If the coupling fails to firmly lock the wheel under all operating conditions regardless of the torque applied to the wheel, they do not prove satisfactory. Where substantial amount of traction is required by the tractor, an auxiliary wheel is sometimes placed on the drive axle axially spaced from the primary wheel which is normally used for any operation of the tractor. If the mounting of the wheel, whether the primary or the auxiliary wheel is economical enough, the same coupling might be used for either wheel. Accordingly, this invention is intended to provide such a coupling for a drive wheel on a tractor.

It is an object of this invention to provide a clamp style wheel bushing.

It is another object of this invention to provide a drive axle and drive wheel coupling through a cantilever hub section on the wheel and a cap hub section bolted to the wheel hub section to firmly lock the wheel on the drive axle.

It is a further object of this invention to provide a clamp style bushing with a wheel hub section having counterbored and threaded holes and a cap hub section with bored holes thereby eliminating the machined surfaces normally required for seating the nuts. Only a cast flat surface is required under the cap screw head as it extends through the bored hole in the cap hub section and through the counterbored hole to the threaded portion and firmly clamp the wheel hub to the drive axle as the bolts tightened. The counterbored holes in the wheel hub section allow a long stressed section of the bolt to provide resilience for retaining a firm locking of the wheel to the drive axle.

The objects of this invention are accomplished by providing a cantilever wheel hub section cast integral with the wheel. The wheel hub section is counterbored and tapped which permits placing of the holes close to the drive axle hole in the wheel hub. The cap hub section is formed with a shaft bearing surface having bored holes aligned with the counterbored holes of the wheel hub section. A tapered keyway is formed in the drive axle and a key slot is formed in the wheel hub section to assure a firm locking of the axle with the wheel under all operating conditions. A plurality of cap screws threadedly engage the tapped holes and firmly seat the arcuate shaft bearing surfaces of the hub sections on the drive axle to firmly lock the wheel and axle together.

The preferred embodiment of the invention is illustrated in the attached drawings.

FIG. 1 illustrates a side elevation view of the wheel;

FIG. 2 is a cross-section view of a portion of the wheel showing the hub sections;

FIG. 3 is a fragmentary view of a cantilever bearing portion of the wheel hub section; and FIG. 4 is an enlarged side view of the hub of the wheel.

The side view of the wheel is shown in FIG. 1. The wheel 1 is preferably a casting as shown. A plurality of holes 2 are provided on the periphery of the wheel to accommodate clamps which clamp the rim of the wheel to the wheel 1. Although sixteen of such holes are conventionally provided in the wheel of this type, only eight are shown to illustrate the manner of fastening the wheel rim.

A plurality of openings 3 and surface facings 4 are angularly spaced around the outboard side of the wheel to accommodate mounting of bolts for supporting inner wheel weights on the wheel. Similarly a plurality of openings 5 are angularly spaced on the wheel to accommodate mounting of a plurality of wheel weights on the outboard side of the wheel. The wheel hub section 8 of the hub 6 is cast with a drive axle opening 7 to receive a drive axle 38. A bearing surface 57 on the wheel hub section 8 is provided to bear against the drive axle in the locking position. The drive axle 38 is firmly bolted on the bearing surface 32 when the cap 9 is mounted on the shaft. A plurality of cap screws 10 firmly lock the cap hub section 9 to the wheel hub section 8. The wheel hub section 8 is provided with a plurality of counterbored holes 11 which are tapped to form the threaded portion 12 on the lower end of the holes which threadedly receive the cap screws 10.

The wheel hub section 8 is integral with the wheel. Reinforcing ribs 13, 14, 15, 16, 17 and 18 radiate from the wheel hub section 8. The reinforcing ribs are formed with curved surfaces 19 and 20 as shown in FIG. 2. The reinforcing ribs absorb tongue from the wheel hub section 8 and also absorb any shear stress between the wheel hub section 8 and the disc portion 21 of the wheel.

Wheel hub section 8 is formed with facings 22 and 23. These facings are cast in the mold and need not be finished since the adjacent facings 24 and 25 do not engage these facings when the wheel hub is assembled. Cap screws 10 seat on the facings 22 and 23 as they are fastened to the cap hub section 9. The drive axle 38 is provided with a tapered keyway 27 in which the tapered surfaces 28 and 29 radiate toward the center of the drive axle 38. Key 30 is received in a key slot 31 of the wheel hub section 8. The key 30 extends completely through the hub of the wheel and the axial opening 7 is slightly larger than the mating shaft 38 which extends through the opening. The larger diameter of the opening 7 as compared to the bearing surface 32 is illustrated in FIG. 4. This larger opening is provided to accommodate loosening of the key 30 from the keyway 27 prior to axial adjustment of the wheel in the wheel bushing. It is preferable to have an interference fit between the key 30 and the key slot 31 so that the key loosens from the tapered keyway 27.

The operation of the drive axle and the clamp style wheel bushing will be described in the following paragraphs.

The drive axle 38 is received in the opening 7 of the wheel hub 6. The axle bears against the axial bearing surface 32 with the key 30 inserted in the keyway 27 of the drive axle 38 and the key slot 31 of the wheel hub section 8. The cap hub section 9 is clamped to the wheel hub section 8 by means of a plurality of cap screws 10. The cap screws 10 extend through the bored holes 35 and through the space intermediate the cap hub section 9 and the wheel hub section 8 and threadedly engage the threaded portions 12 of each of the plurality counterbored holes 11 in the wheel hub section 8. A plurality of cap screws firmly force the bearing surface 32 and the bearing surface 57 together to firmly keep the key 30 in the keyway 27 and the key slot 31 and force the bearing surfaces 32 and 57 in firm engagement with the external periphery of the drive axle 38. This locks the drive shaft axle 38 in the wheel hub 6.

When it is desired to adjust the drive axle 38 axially relative to the wheel 1, the wheel is rotated so that the key 30 is vertically over the center line of the drive axle 38. As the cap screws 10 are loosened from the threaded portion 12 of the counterbored holes 11, the drive axle 38 drops downwardly from the wheel hub section 8 loosening the key 30 from the keyways 27. This will allow axial movement of the drive axle 38 relative to the wheel 1. If the tractor is jacked up on the side of the wheel which is loosened, the wheel can then be slid axially to a position desired on the drive axle to provide the desired tread width of the wheels. When the wheel is repositioned on the axle, the cap screws 10 are again tightened to firmly lock the wheel on the drive axle at the desired position to provide the wheel tread width necessary.

The embodiments of the invention in which an exclusive property or privilege is claimed are defined as follows:

1. A wheel and drive axle assembly comprising, a drive axle, an integral wheel and wheel hub section defining an axle opening and an arcuate axle bearing surface in said wheel hub section engaging said drive axle, means defining a rectangular key slot and a tapered keyway in said wheel hub and said axle, a key frictionally locked in said key slot and adapted for withdrawing from said keyway when said hub is loosened from said axle, reinforcing ribs between said wheel hub section and wheel extending downwardly from the wheel hub section to broaden the base and reinforce said wheel hub section, means defining counterbored and threaded holes in said wheel hub section with the counterbore on the axle engaging side of said wheel hub section, a cap hub section defining an arcuate axle bearing surface for engaging said drive axle and fastening portions in spaced relation to said wheel hub section, means defining bored holes in said cap hub section aligned with said counterbored and threaded holes in said wheel hub section, a plurality of cap screws extending through said bored holes in said cap hub section and threadedly engaging the threaded portion of the counterbored and threaded holes in said wheel hub section to thereby provide resilience of the free length of said bolts to retain locking of said wheel on said drive axle under varying stress and thermal conditions.

2. A wheel and drive axle assembly as set forth in claim 1 wherein said axle defines said tapered keyway for ease in removing said key, said wheel hub section defines said key slot having parallel sides, a key having a tapered portion received in said keyway and a rectangular portion received in said key slot with an interference fit to lock said key in said wheel hub section and to nonrotatably lock said drive axle with said wheel.

3. A wheel and drive axle assembly as set forth in claim 1 wherein said wheel hub section and said cap hub section each define an arcuate axial bearing surface of less than 180° for engaging said drive axle.

4. A wheel and drive axle assembly as set forth in claim 1 wherein said wheel hub section defines a cantilevered hub section connected to the integral reinforcing ribs extending radially from said wheel hub section to absorb torque and shear stress in said wheel.

5. A wheel and drive axle assembly as set forth in claim 1 including means adapted for supporting a wheel weight concentrically around said hub section of said wheel.

6. A wheel and drive axle assembly as set forth in claim 1 wherein said axle bearing surface of said wheel hub section defines an arcuate surface for engaging the periphery of said drive axle, means locating said counterbore of said counterbored holes adjacent said arcuate surface, said counterbore thereby removing stress concentration from the surface to the bottom of the counterbore.

7. A wheel and drive axle assembly as set forth in claim 1 wherein said wheel defines an enlarged axle opening diametrically opposite of said axle bearing surface of said wheel hub section to accommodate movement of said axle radially into said opening to loosen the key from the keyway in said axle when said bolts are loosened and said wheel is adjustably moved axially relative to said drive axle.

8. A wheel and drive axle assembly as set forth in claim 1 wherein said wheel defines a cast integral structure of said wheel and said wheel hub section.

9. A wheel and drive axle assembly as set forth in claim 1 wherein said wheel hub section and said cap hub section define arcuate surfaces of less than 180° for seating on said drive axle and a spaced relation between the edges of said sections for pressing the arcuate surfaces against said axle when assembled.

10. A wheel and drive axle assembly as set forth in claim 1 wherein said cap screws extend through said bored holes in said cap hub section and the counterbored portion of said holes in said wheel hub section, said counterbored holes include a threaded portion approximately half of the length of the holes in said wheel hub section, said cap screws define a resilient stressed length in the bored holes of said cap and said counterbored portion of said counterbored holes in said wheel hub to provide resilience in the long stressed length of the bolts to prevent loosening of the axle with the wheel hub.

* * * * *